United States Patent
Elliott

(10) Patent No.: US 9,858,627 B2
(45) Date of Patent: Jan. 2, 2018

(54) FUEL DISTRIBUTION SYSTEM WITH CORRECTION MECHANISM

(71) Applicant: Oracle International Corporation, Redwood Shores, CA (US)

(72) Inventor: Martin Elliott, Surrey (GB)

(73) Assignee: Oracle International Corporation, Redwood Shores, CA (US)

( * ) Notice: Subject to any disclaimer, the term of this patent is extended or adjusted under 35 U.S.C. 154(b) by 100 days.

(21) Appl. No.: 15/155,373

(22) Filed: May 16, 2016

(65) Prior Publication Data

US 2017/0221160 A1 Aug. 3, 2017

Related U.S. Application Data

(60) Provisional application No. 62/289,555, filed on Feb. 1, 2016.

(51) Int. Cl.
| | |
|---|---|
| G06Q 50/06 | (2012.01) |
| B67D 7/04 | (2010.01) |
| B67D 7/70 | (2010.01) |
| B67D 7/30 | (2010.01) |
| G06Q 20/18 | (2012.01) |
| G06Q 40/00 | (2012.01) |

(52) U.S. Cl.
CPC .............. *G06Q 50/06* (2013.01); *B67D 7/04* (2013.01); *B67D 7/305* (2013.01); *B67D 7/70* (2013.01); *G06Q 20/18* (2013.01); *G06Q 40/12* (2013.12)

(58) Field of Classification Search
CPC ........ G06Q 50/06; G06Q 40/12; G06Q 20/18; B67D 7/305; B67D 7/04; B67D 7/70
See application file for complete search history.

(56) References Cited

U.S. PATENT DOCUMENTS

| | | | | |
|---|---|---|---|---|
| 3,536,109 A | * | 10/1970 | Wright | G05B 19/18 137/234.6 |
| 4,247,899 A | | 1/1981 | Schiller et al. | |
| 4,977,391 A | * | 12/1990 | Coquerel | B67D 7/08 235/132 R |
| 5,447,062 A | * | 9/1995 | Kopl | B67D 7/085 73/261 |

(Continued)

FOREIGN PATENT DOCUMENTS

| | | |
|---|---|---|
| EP | 1 168 257 A1 | 1/2002 |
| EP | 1 184 241 A1 | 3/2002 |

(Continued)

OTHER PUBLICATIONS

Torex Retail Holdings Limited, "Torex Lucas POS—Fuel Sales", 19/03/08, 18 pages.

*Primary Examiner* — Nicolas A Arnett
(74) *Attorney, Agent, or Firm* — Miles & Stockbridge P.C.

(57) ABSTRACT

The fuel distribution system with correction mechanism includes systems and methods for distributing fuel at a plurality of fuel pumps. Fuel is distributed at a first fuel pump and at a second fuel pump. Erroneously, multiple payments are received for the distribution of fuel at the first fuel pump. One of the multiple payments is applied to an outstanding transaction of the second fuel pump. The difference amount between the payment applied to the second fuel pump and an amount associated with the outstanding transaction of the second fuel pump is calculated and resolved.

20 Claims, 9 Drawing Sheets

(56) References Cited

U.S. PATENT DOCUMENTS

| | | | |
|---|---|---|---|
| 5,719,781 A | 2/1998 | Leatherman et al. | |
| 6,176,421 B1 | 1/2001 | Royal, Jr. et al. | |
| 6,360,141 B1 | 3/2002 | Jensen | |
| 6,446,049 B1 * | 9/2002 | Janning | A01K 15/023 141/94 |
| 6,535,726 B1 | 3/2003 | Johnson | |
| 6,651,706 B2 * | 11/2003 | Litt | B67D 7/106 141/234 |
| 7,774,231 B2 | 8/2010 | Pond et al. | |
| 7,938,321 B2 * | 5/2011 | Harrell | G07F 13/025 235/379 |
| 8,204,802 B2 * | 6/2012 | Sison | G06Q 40/12 705/30 |
| 8,554,688 B2 * | 10/2013 | Harrell | G06Q 20/347 705/64 |
| 9,076,139 B2 | 7/2015 | Broome | |
| 2001/0037839 A1 * | 11/2001 | Litt | B67D 7/106 141/234 |
| 2006/0271431 A1 | 11/2006 | Wehr et al. | |
| 2007/0106543 A1 * | 5/2007 | Baughman | G06Q 10/06311 705/7.21 |
| 2007/0261760 A1 * | 11/2007 | Harrell | B67D 7/08 141/197 |
| 2008/0154735 A1 | 6/2008 | Carlson | |
| 2008/0235105 A1 | 9/2008 | Payne et al. | |
| 2008/0308628 A1 | 12/2008 | Payne et al. | |
| 2009/0164347 A1 * | 6/2009 | Sison | G06Q 30/04 705/30 |
| 2010/0023162 A1 | 1/2010 | Gresak et al. | |
| 2010/0332363 A1 * | 12/2010 | Duddle | B67D 7/348 705/34 |
| 2014/0351138 A1 | 11/2014 | Frieden et al. | |
| 2015/0170298 A1 * | 6/2015 | Park | G07F 13/025 705/39 |
| 2017/0243410 A1 * | 8/2017 | Caballero | G07C 5/008 |

FOREIGN PATENT DOCUMENTS

| | | |
|---|---|---|
| EP | 1 335 333 A2 | 8/2003 |
| NO | 2011/153379 A2 | 12/2011 |
| WO | 01/11858 A1 | 2/2001 |
| WO | 01/52202 A1 | 7/2001 |
| WO | 02/11087 A1 | 2/2002 |

\* cited by examiner

Wrong Fuel Details

| Till Txns Grade | Volume | Value | |
|---|---|---|---|
| Business Day: 15/11/14 | | | |
| Original Sale | | | |
| 1    41 Diesel | 21.80 | 25.27 | 710 |
| Allocated Sale | | | |
| 1    44 Diesel | 26.60 | 30.83 | 720 |
| Allocated Payment(s) | | | |
| GBP | | 5.56 | 730 |

900

FUEL DISTRIBUTION SYSTEM WITH CORRECTION MECHANISM

CROSS REFERENCE TO RELATED APPLICATION

This application claims priority to provisional patent application Ser. No. 62/289,555 which was filed on Feb. 1, 2016, the contents of which is hereby incorporated by reference in its entirety.

FIELD OF INVENTION

Embodiments of the present invention are generally directed toward fuel distribution systems and methods, and more particularly, to fuel distribution systems and methods that include a correction mechanism.

BACKGROUND

In the retail distribution of fuel, a variety of fuel distribution mechanisms are used. A gas station is a common mechanism for the distribution of fuel to retail customers. In a typical scenario, a user parks his or her vehicle alongside a fuel pump, and manually operates it to retrieve fuel to the vehicle. Traditionally, a user pays for the dispensed fuel after the distribution of the fuel has occurred. It is often necessary to pay for the fuel at a payment counter spaced apart from the fuel pumps, especially when additional items are being purchased. For example, the payment counter is frequently located within a convenience store associated with the gas station. This can be inconvenient at busy times when users must wait within a queue to complete payment.

Gas stations typically include a plurality of fuel pumps. In addition, a cashier's terminal at the payment counter may monitor the usage of the fuel pumps by numerous customers as the come and go. At busy locations, gas stations turnover very large amounts of revenue. As a result, payment cards, such as debit or credit cards, are an increasingly common method of payment. Because the value of fuel purchased often exceeds the value which would be convenient or safe to carry in cash, payment cards have become much more common. The increased use of payment cards presents a number of challenges, some of which have yet to be resolved.

SUMMARY OF INVENTION

Accordingly, the present invention is directed to a fuel pump with a correction mechanism that substantially obviates one or more problems due to limitations and disadvantages of the related art.

Additional features and advantages of the present invention will be set forth in the description which follows, and in part will be apparent from the description, or may be learned by practice of the invention. The advantages of the present invention will be realized and attained by the structure particularly pointed out in the written description and claims hereof as well as the appended drawings.

To achieve these advantages and in accordance with the purpose of the present invention, as embodied and broadly described, the fuel pump with correction mechanism includes systems and methods for distributing fuel at a plurality of fuel pumps. Fuel is distributed at a first fuel pump and at a second fuel pump. Erroneously, multiple payments are received for the distribution of fuel at the first fuel pump. One of the multiple payments is applied to an outstanding transaction of the second fuel pump. The difference amount between the payment applied to the second fuel pump and an amount associated with the outstanding transaction of the second fuel pump is calculated and resolved.

In some embodiments, the difference amount may be resolved as a drive-off. Alternatively, or additionally, the difference amount may be applied to a subsequent transaction.

In some embodiments, reports of erroneous fuel transactions may be generated on a periodic basis. Such reports may be configured to track and store the amounts of fuel sold in connection with the erroneous fuel transactions.

It is to be understood that both the foregoing general description and the following detailed description are exemplary and explanatory and are intended to provide further explanation of the invention as claimed.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates an example report according to an example embodiment of the present invention.

DETAILED DESCRIPTION

Figure 1:
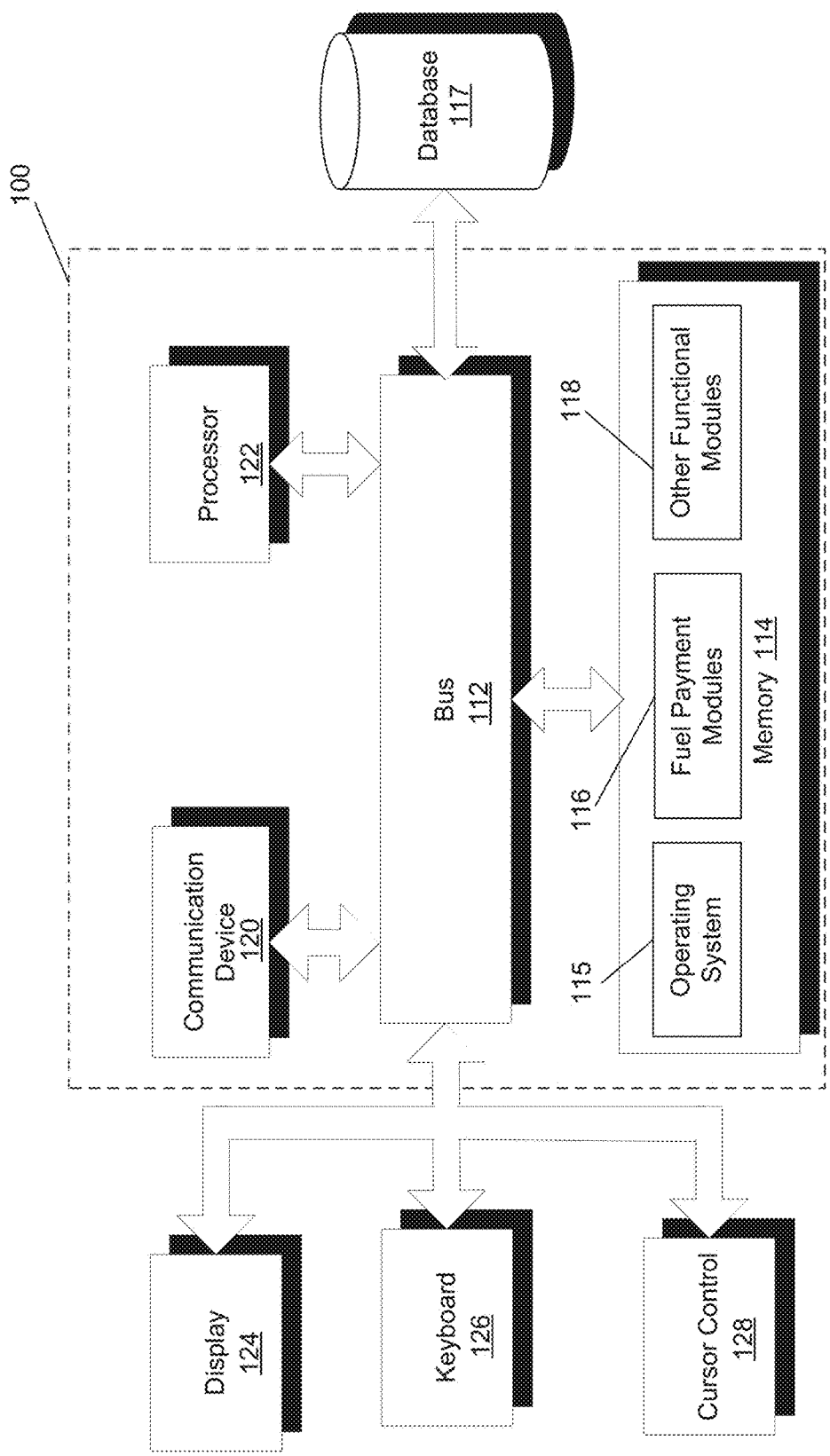
FIG. 1 is a block diagram of a computer server/system in accordance with an example embodiment of the present invention.

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse. Similarly, techniques for processing fuel transactions are described, however, it should be understood that the embodiments may be applied to the sale of gasoline, ethanol, diesel, liquid propane, electric charge and/or other types of fuel.

At gas stations, cashiers and/or customers occasionally complete sales transactions for the wrong fuel pump. For example, the cashier and customer may erroneously complete a payment transaction for fuel of a different customer at a different fuel pump. In some instances, the customer may not have been paying attention (e.g., the customer tells the cashier the wrong fuel pump number). In other instances, the cashier may accidentally select the wrong fuel pump number, present the transaction of the wrong fuel pump to the customer for payment, and the customer may complete payment without catching the cashier's mistake.

Although such mistakes may appear to be trivial, payment for fuel on the wrong fuel pump is very difficult for the cashier to resolve. In addition, such mistakes are especially difficult to correct if a first customer paid by a credit or debit card the wrong fuel pump and then left the gas station. As a result, when the second customer desires to make a payment for the purchase of fuel, the second customer is unable to do so because the transaction is a completed transaction rather than a pending transaction. To address this problem, the cashier may manually generate a "dummy" transaction, and the second customer may pay for the dummy transaction. The lingering fuel purchase transaction of the first customer is then cleared off to a miscellaneous tender (e.g., "wrong pump" or "drive-off"). Unfortunately, such solutions are time consuming and susceptible to fraud and additional errors. Moreover, such solutions do not adequately track the amount of fuel sold, especially the amount of each grade of fuel sold. As a result, it may become difficult for the gas station to determine when storage tanks should be refilled.

Accordingly, the embodiments of the present invention introduce functionality which enables the cashier to select a recently completed transaction and to "correct" it. The correction is effectively a post-void of the original transaction, generating two new transactions from the constituent parts (i.e., post-voided transaction's fuel sale line combined with a new "correct" payment, and post-voided transaction's payment lines applied to the "correct" fuel sale with appropriate top-up/refund tender). In other words, when multiple payments are received for the distribution of fuel at the same fuel pump, one of the multiple payments is applied to an outstanding transaction. The difference amount between the payment applied to the original fuel sale and an amount associated with the outstanding transaction is calculated and resolved.

Thus, the original transaction is voided, and the component parts (e.g., sales lines, fuel sales, etc.) and payments are made available to construct two new and fairly accurate transactions. Although the resulting transactions may not be completely accurate, the subsequent customer can pay for their genuine fuel sale and will have the transaction that they expected along with the correct value, volume, product, etc. The original customer may not have paid enough or might have paid too much, and may have left, so it may not be able to retrieve the balance due. Nevertheless, the embodiments significantly improve reconciliation accuracy, reduce fraud, and simplify and quicken the resolution of incorrect payments.

FIG. 1 is a block diagram of a computer server/system 100 in accordance with an example embodiment of the present invention.

As shown in FIG. 1, system 100 may include a bus device 112 and/or other communication mechanism(s) configured to communicate information between the various components of system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, fuel payment modules 116, and other applications 118, stored within memory 114.

System 100 may include memory 114 for storing information and instructions for execution by processor 122. Memory 114 may store software modules that provide functionality when executed by processor 122. The modules may include an operating system 115 that provides operating system functionality for system 100. The modules can include fuel payment modules 116 configured to correct erroneous payments. Operating system 115 provides operating system functionality for system 100. Fuel payment modules 116 may include one or more application program interfaces ("API") that enable users to monitor gasoline purchases, identify erroneous transactions, and make corrections using a post-void of the original transaction. In some instances, fuel payment modules 116 may be implemented as an in-memory configuration that is used to generate and execute rule scripts that control content displayed within a webpage, as will be described in more detail below.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Although shown as a single system, the functionality of system 100 may be implemented as a distributed system. For example, memory 114 and processor 122 may be distributed across multiple different computers that collectively comprise system 100. In one embodiment, system 100 may be part of a device (e.g., gas pump, cashier kiosk, smartphone, tablet, computer, etc.), and system 100 may provide manipulation of gasoline transactions. In another embodiment, system 100 may be separate from the device, and may remotely provide the aforementioned functionality for the device.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 100.

System 100 can be part of a larger system. Therefore, system 100 can include one or more additional functional modules 118 to include the additional functionality. In one embodiment, fuel payments module 116 is part of the "Retail Convenience and Fuel Point of Service" from Oracle Corp., and additional functionality is provided by module 118. A database 117 is coupled to bus 112 to provide centralized storage for modules 116 and 118 and to store user profiles, transactions history, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

The functionality disclosed herein may be implemented on separate servers or devices that may be coupled together over a network. Further, one or more component of system 100 may not be included. For example, for functionality of a user client, system 100 may be a coupled to a gasoline pump that includes a processor, memory, and a display, but may not include one or more of the other components shown in FIG. 1.

Figure 2:
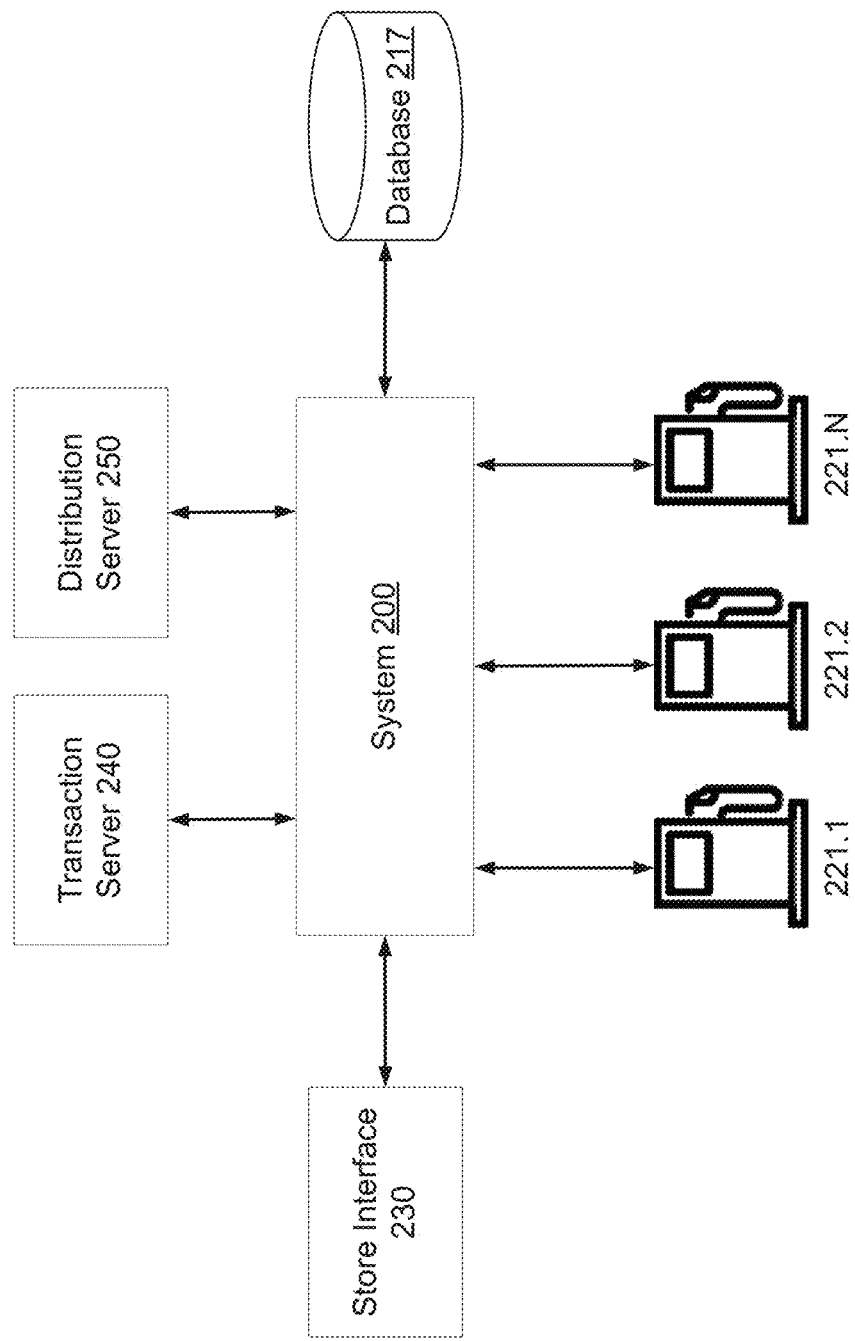
FIG. 2 illustrates a block diagram of a fuel distribution system according to an example embodiment of the present invention.

FIG. 2 illustrates a block diagram of a fuel distribution system 200 according to an example embodiment of the present invention. Fuel distribution system 200 may be implemented as a gas station, convenient store, marina, and/or any other fuel distribution environment. Although FIG. 2 illustrates an example implementation, numerous other implementations (such as the implementation shown in FIG. 9) may be used in conjunction with the embodiments of the present invention.

As shown in FIG. 2, fuel distribution system 200 is coupled to database 217 and fuel distribution mechanisms 221.1-221.N. In some embodiments, fuel distribution system 200 may be implemented by system 100 which is described in detail in connection with FIG. 1. Similarly, fuel distribution system 200 may be coupled to database 217 which may be implemented by database 117 which is also described in detail in connection with FIG. 1.

Fuel distribution system 200 may be coupled to store interface unit 230. Store interface unit 230 may include a cashier's terminal, personal computer, and/or any other data terminal configured to process payments for fuel dispensed by fuel distribution mechanisms 221.1-221.N. Store interface unit 230 typically includes a user input device (e.g., a keyboard, touchscreen, etc.), a display device (e.g., LCD monitor), and one or more devices for receiving and/or processing payments (e.g., a credit/debit card reader, cash drawer, etc.). Store interface unit 230 enables the cashier to process payments according to the various embodiments of the invention.

Fuel distribution mechanisms 221.1-221.N may include fuel pumps, or any other appropriate fuel distributing apparatuses. For example, fuel distribution mechanisms 221.1-221.N may be implemented using single or multiple hose configurations. In another example, fuel distribution mechanisms 221.1-221.N may distribute one or more fuels, such as gasoline, diesel, ethanol, electrical charge, and the like. Similarly, fuel distribution mechanisms 221.1-221.N also may distribute varying fuel grades. Fuel distribution mechanisms 221.1-221.N are typically configured to operate in cooperation with store interface unit 230 such that fuel may be distributed and payments may be processed.

In some embodiments, fuel distribution system 200 may be coupled to transaction server 240. Transaction server 240 may include a variety of components configured to process fuel transactions. For example, transaction server 240 may receive and store payment information. In addition, transaction server 240 may be configured to process fuel transactions in conjunction with a variety of remote financial institutions (e.g., Visa, Mastercard, etc.).

In addition, fuel distribution system 200 may be coupled to distribution server 250. Distribution server 250 may include a variety of components configured to control distribution of fuel at mechanisms 221.1-221.N. For example, distribution server 250 may generate and/or receive control signals depending of receipt of payment and/or availability of a particular grade of fuel.

Although shown as separate components, database 217, transaction server 240, and distribution server 250 may be integrated as a single device, such as fuel distribution system 200. Between fuel distribution system 200, database 217, fuel distribution mechanisms 221.1-221.N, store interface unit 230, transaction server 240, and distribution server 250, a variety of information may be exchanged. For example, price, payment information, amounts of fuel to distribute, and the like may be exchanged.

Figure 3:
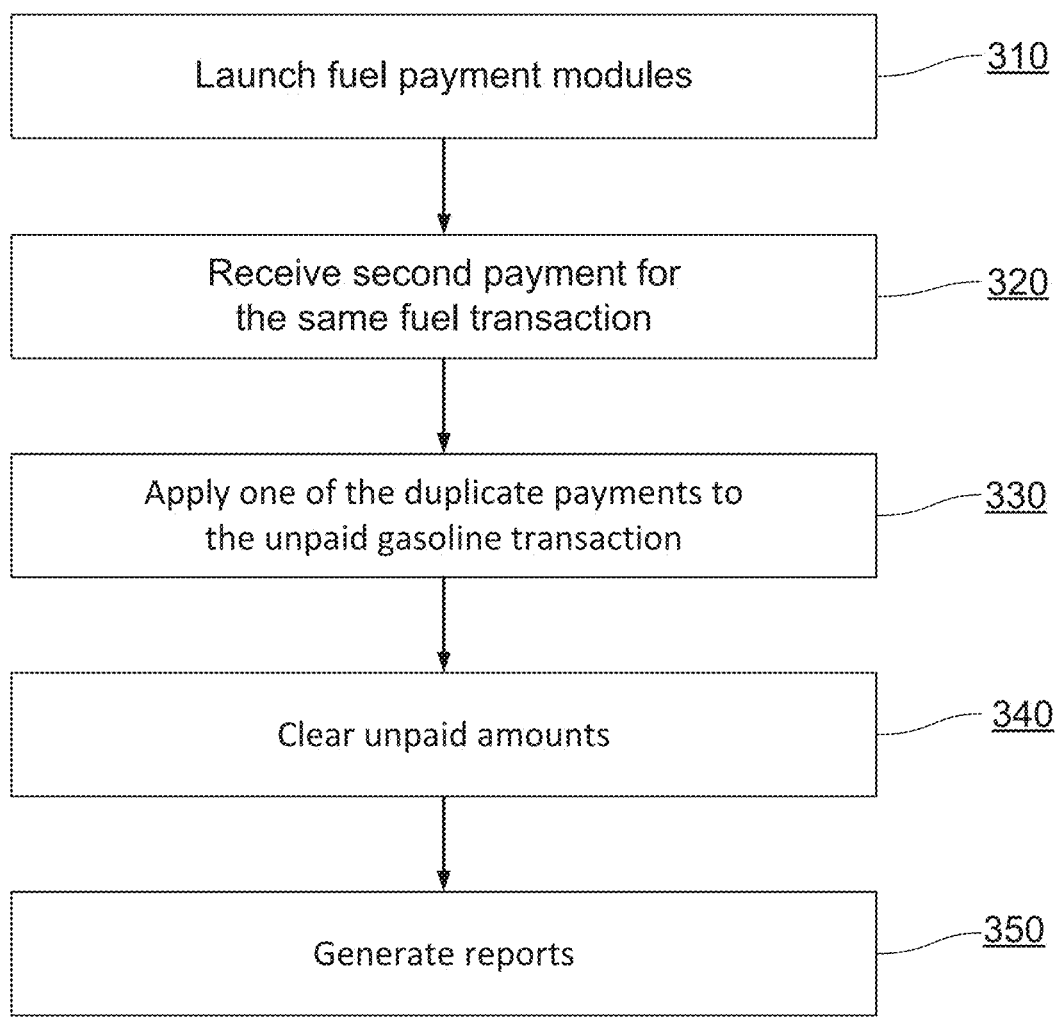
FIG. 3 illustrates a flow diagram of a gasoline payment module according to an example embodiment of the present invention.

FIG. 3 illustrates a flow diagram 300 of a gasoline payment module according to an example embodiment of the invention. In one embodiment, the functionality of the flow diagram of FIG. 3 (and FIG. 4), described below, is implemented by software stored in memory or other computer-readable or tangible medium (e.g., fuel payment modules 116 of FIG. 1), and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

In connection with the discussion of FIG. 3, example transactions will be described. The example transactions are merely illustrative, and are not intended to limit the embodiments of the invention. The example transactions are as follows. Suppose Pump 1 has $25.27 of gasoline drawn by Customer A, and Pump 3 has $30.83 of gasoline drawn by Customer B. In this example, Customer B erroneously pays for Pump 1 in the amount of $25.27 instead of $30.83 owed for Pump 3. After paying for the wrong pump, Customer B leaves. When Customer A comes to the cashier to pay for Pump 1, there is no pending transaction on Pump 1 for Customer A to pay.

At 310, the cashier launches the fuel payment modules (e.g., "wrong payment modules"). In some embodiments, the fuel payment modules may not be initiated unless there is at least one unpaid fuel sale on the system. By launching the fuel payment modules, erroneous fuel transactions may be identified and corrected according to the embodiments described herein. For example, the fuel pump that was erroneously paid, Pump 1 in the above example, may be identified and selected.

Although an erroneous payment has already been made, a second payment may be received for the same fuel sale, at 320. In contrast to prior systems, the cashier is no longer required to manually generate a "dummy" transaction.

Instead, the second payment may be received and processed as an ordinary payment. In addition, the lingering fuel purchase transaction is no longer cleared off to a miscellaneous tender (e.g., "wrong pump" or "drive-off").

Next, at 330, one of the duplicate payments may be applied to any unpaid fuel transactions. As multiple payments for the same fuel sale of Pump 1 in the amount of $25.27 have been made, any of the multiple payments may be applied toward the outstanding fuel sale which is still pending. Returning to the above example, the duplicate payment of Pump 1 may be applied to the $30.83 outstanding on Pump 3.

After the incorrectly paid transaction occurs, the cashier may be prompted to process the stored payments against the correct transaction. The cashier may either be prompted instantaneously as incorrect payments are identified or as a batch process (e.g., at the end of the day). If the cashier resolves incorrect payments as a batch process, any fuel transaction selected after a definable wait period may be cleared with the outstanding wrong fuel payment.

In some instances, the cashier may be unable to readily identify the transaction for assigning the duplicate payment, and may assign the duplicate payment at a later time. If the erroneously paid transaction remains unresolved, an overdue sale warning may be displayed to the cashier when the pump associated with the transaction is subsequently used by another customer. Alternatively, the cashier's shift may not end until the original wrong pump payment has been cleared and allocated to the correct transaction. Here, the display may prompt the cashier for the erroneous transaction to be cleared if a shift end is attempted.

Any still unpaid amounts may be cleared as a drive-off, at 340. Here, an amount of $5.56 remains unpaid for Pump 3, and the unpaid amount may be cleared as drive-off. By eliminating the use of a dummy transaction, and by reducing the amount of drive-off, the amount fuel available for distribution may be more accurately tracked as compared to prior systems. In some instances, surplus payment amounts may remain. Such surplus payments may be applied to subsequent transactions to further reduce the use of drive-off.

Lastly, at 350, reports of erroneous fuel transactions may be generated on a periodic basis (e.g., daily, weekly, monthly, etc.). Such reports may track and store the amount of fuel sold in connection with the erroneous fuel transactions. Alternatively, or additionally, such reports may track and store the amount of each grade of fuel sold in connection with the erroneous fuel transactions.

Figure 4:
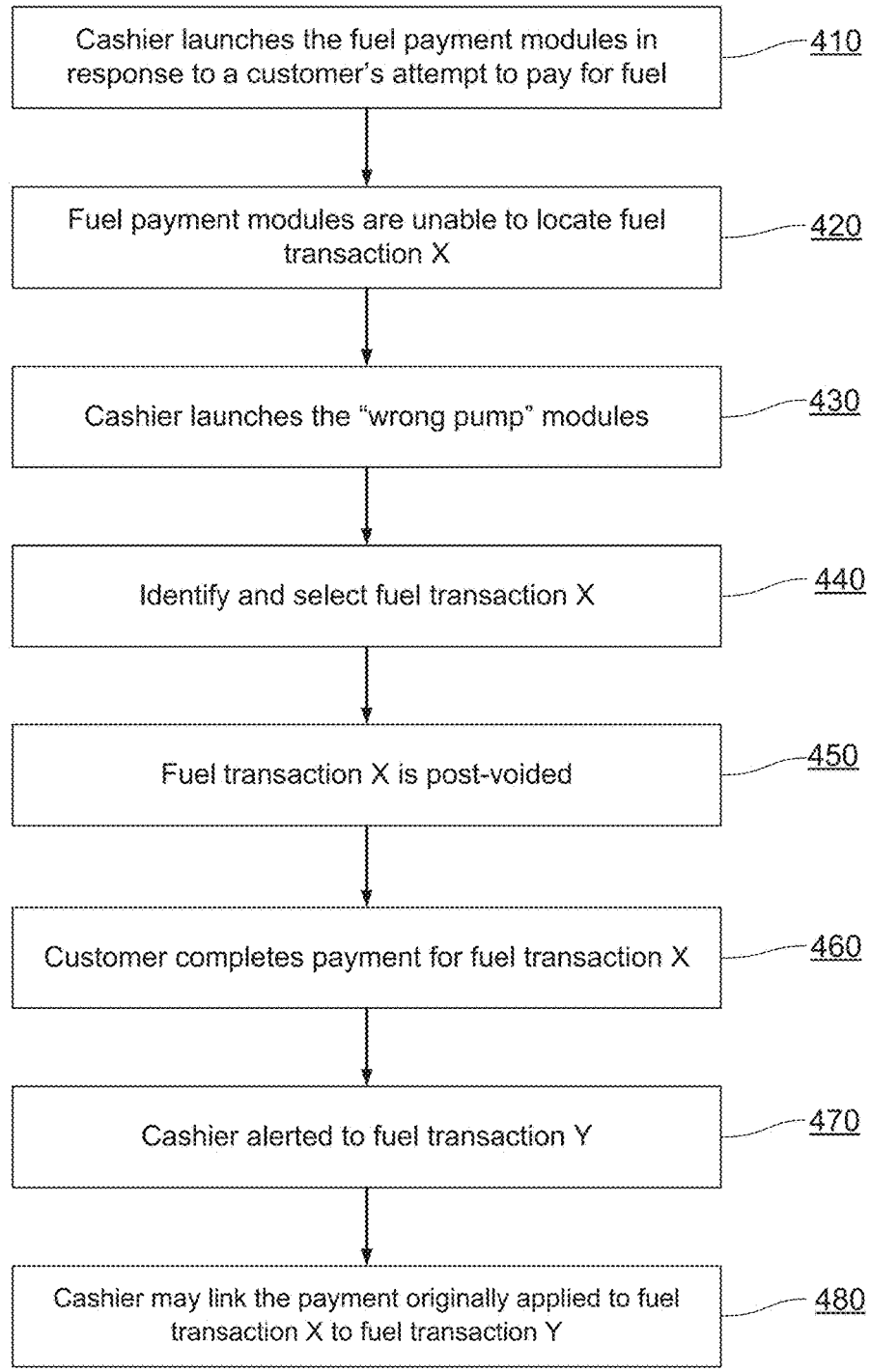
FIG. 4 illustrates a flow diagram of a gasoline payment module according to another example embodiment of the present invention.

FIG. 4 illustrates a flow diagram 400 of a gasoline payment module according to another example embodiment of the invention.

At 410, the cashier launches the fuel payment modules in response to a customer's attempt to pay for fuel transaction X on Pump 1. Next, at 420, the fuel payment modules are unable to locate and identify fuel transaction X. For example, fuel transaction X may have been erroneously paid, or otherwise cleared off. In response to the fuel modules inability to locate and identify fuel transaction X, the cashier may launch the "wrong pump" modules, at 430. For example, the cashier may press a "wrong pump button" to retrieve a list of recent transactions for a particular fuel pump, such as pump A.

Here, at 440, the cashier may identify and select fuel transaction X. Next, at 450, the transaction that includes fuel transaction X is post-voided, which results the transaction being split into a Payment P (to be saved) and fuel transaction X. As a result, fuel transaction X becomes available for payment, and other items may also be added to the transaction. The customer can pay for fuel transaction X, completing the sale, at 460.

Meanwhile, another fuel transaction, such as transaction Y, is awaiting payment and may have been waiting a while. The cashier may be alerted to fuel transaction Y, at 370. For example, a color change to the text of transaction Y within the list of transactions may be used to alert the cashier, for example.

As the fuel transaction Y is a potential drive off with an outstanding payment balance due, the cashier may link the payment originally applied to fuel transaction X to fuel transaction Y, at 480. Thus, any outstanding balance or refund may be cleared.

Figure 5:
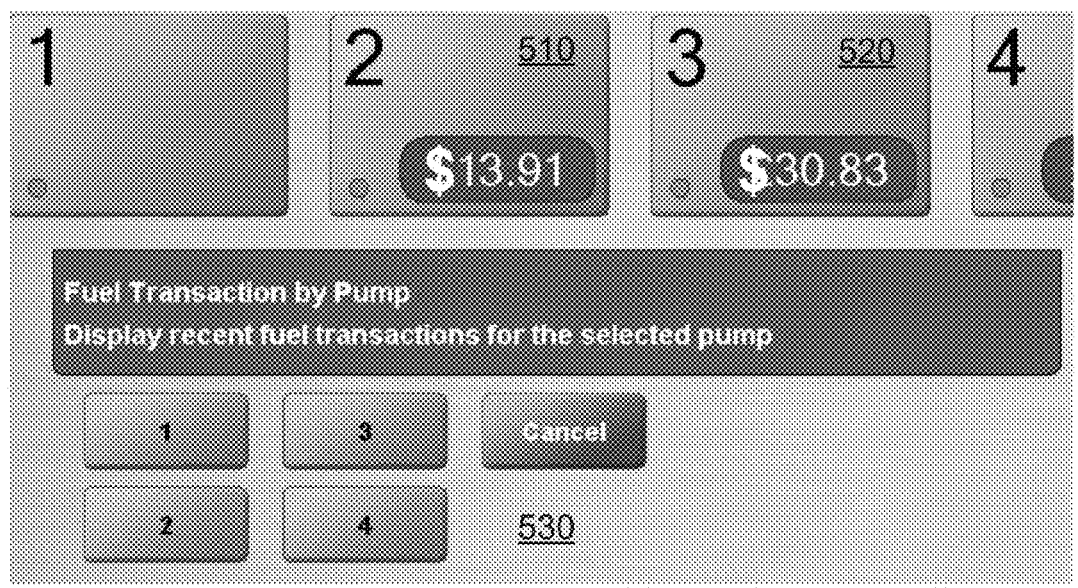
FIG. 5 illustrates an example display that may be configured to identify and select the fuel pump that was erroneously paid according to an example embodiment of the present invention.

FIG. 5 illustrates an example display 500 that may be configured to identify and select the fuel pump that was erroneously paid according to an example embodiment of the present invention. For each fuel pump, any outstanding amounts may be displayed. In the example display 500 of FIG. 5, fuel pump 2 has an unpaid amount of $13.91 at 510, and fuel pump 3 has an unpaid amount of $30.83 at 520. In addition, the most recent transactions for any selected pump may be displayed. The cashier may select any of fuel pumps 1, 2, 3, and 4 within pump selection section 530. Upon selection of a particular fuel pump, a listing of the selected fuel pump's recent transactions may be displayed.

Figure 6:
FIG. 6 illustrates an example display that may be configured to illustrate unpaid amounts to be cleared as drive-off according to an example embodiment of the present invention.

FIG. 6 illustrates an example display 600 that may be configured to illustrate unpaid amounts to be cleared as drive-off according to an example embodiment of the present invention. For each fuel pump, any outstanding amounts may be displayed. Similar to the example of FIG. 5, fuel pump 2 has an unpaid amount of $13.91 at 610, and fuel pump 3 has an unpaid amount of $30.83 at 620. As shown in the example display 600 of FIG. 6, an amount of $5.56 remains unpaid for one of the fuel pumps. For example, the unpaid amount of $5.56 at 630 may result from a duplicate payment of $25.27 being applied to the unpaid balance of $30.83 at 620. The unpaid amount may be cleared as a drive-off, at 640.

FIG. 7 illustrates an example report 700 according to an example embodiment of the present invention. As shown in the example report 700, the transaction number and method of payment used to clear any outstanding amounts may be included in the report. In the example report, duplicate transaction 710 may be applied to pending transaction 720. Here, the difference may be cleared as drive-off at 730.

Figure 8:
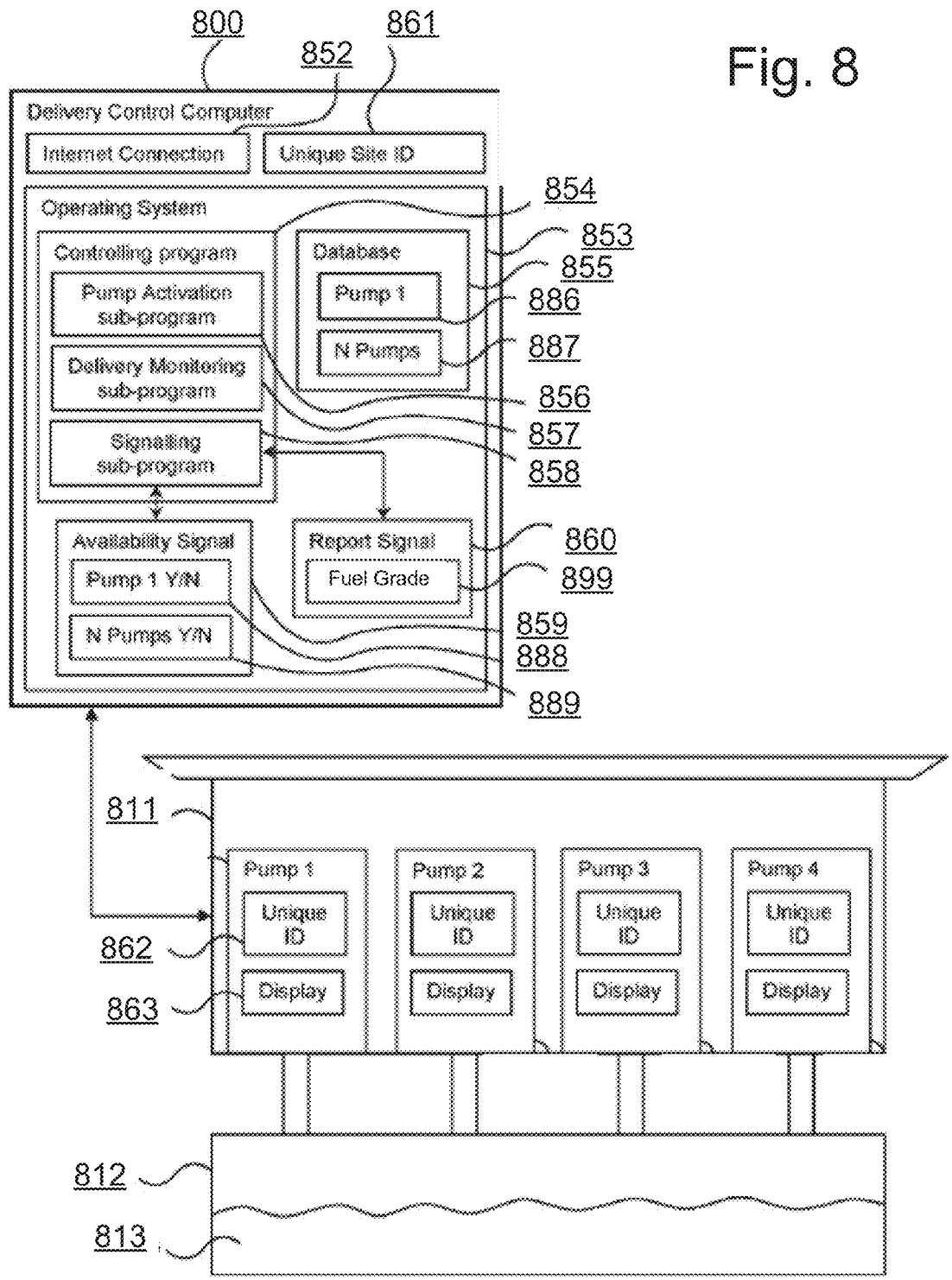
FIG. 8 illustrates is an example fuel distribution server according to an example embodiment of the present invention.

FIG. 8 illustrates is an example distribution server 800 according to an example embodiment of the present invention. As shown in FIG. 8, distribution server 800 is comprised of a variety of components including Internet connection 852 and operating system 853, on which is supported controlling program 854 and database 855.

Controlling program 854 may be adapted to the embodiments of the present invention and may include various sub-programs which enable it to operate on operating system 853, and to receive, display, and/or otherwise manipulate data related to fuel transactions. Within controlling program 854, sub-programs may include pump activation sub-program 856, delivery monitoring sub-program 857, and signaling sub-program 858.

Signaling sub-program 858 may be configured to send and receive various data signals from the other components of the system (e.g., transaction server 240 of FIG. 2). Such signals include availability signals 859 that may indicate the availability of each fuel grade 813 stored within fuel tanks 812. Such signals may further include report signals 860 that track and store the amount of fuel sold in connection with the erroneous fuel transactions, as well as the payments that have been re-appropriated according to the embodiments described herein. In addition, report signals 860 may track and store the amount of each grade of fuel sold in connection with the erroneous fuel transactions, such as fuel grade report 899. Any of the reports may be generated in response to a user request, or alternatively, on a scheduled or periodic basis.

Distribution server 800 may be located at gas station 811. Accordingly, each distribution server 800 also may include unique site identifier 861 that may be associated with each of the gas station's fuel pumps. In addition, each of the fuel pumps also may include a unique fuel pump identifier 862. Unique fuel pump identifier 862 may be used by customers and cashiers alike in connection with fuel sales, as discussed above.

Gas station 811 further includes one or more tanks 812, each tank including a varying grade of fuel 813. Fuel pumps 1-4 are connected to tanks 812 such that fuel can be dispensed into vehicle fuel tanks using known mechanisms. As is currently known, each of fuel pumps 1-4 may further include a display to visually depict various aspects of the fuel transactions.

Distribution server 800 is preferably situated in a secure interior location, for example in a back office, and is connected to the fuel pumps 1-4 with suitable communications cables, for example Ethernet cables, or the like. A remote command computer (not shown) also may be located at gas station 811 or at another facility of the fuel provider.

Distribution server 800 may be coupled to a remote transaction server (e.g., transaction server 240 of FIG. 2). The remote transaction server may include a variety of components configured to process fuel transactions. For example, the remote transaction server may receive and store payment information. In addition, the remote transaction server may be configured to process fuel transactions in conjunction with a variety of remote financial institutions (e.g., Visa, Mastercard, etc.).

In some embodiments, system 800 may be connected to different gas stations which are connectable to one another over the Internet. Any known communications protocol can be used, along with any known data security mechanisms. In such embodiments, erroneous transactions may be corrected across multiple gas stations.

Figure 9:
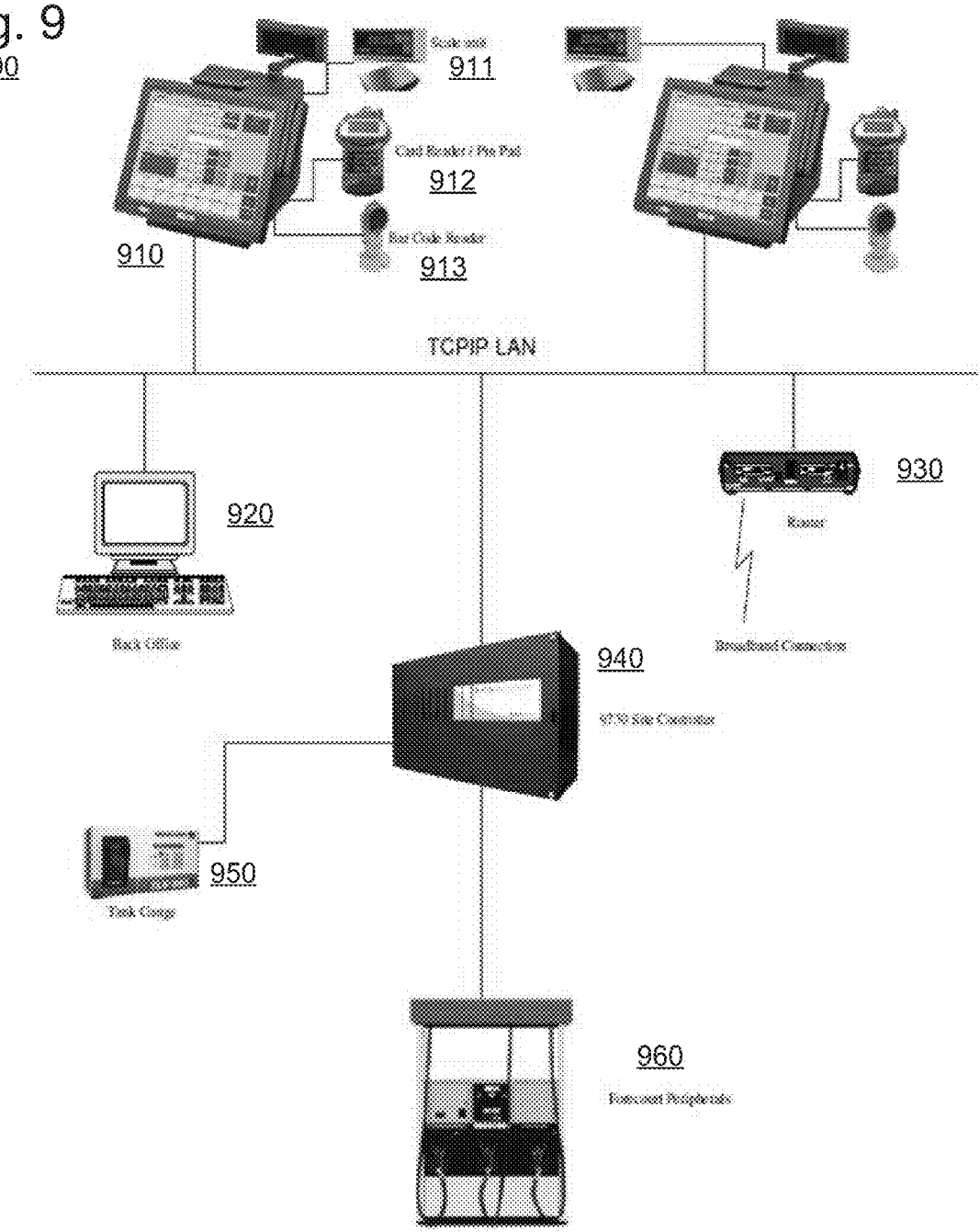
FIG. 9 illustrates a block diagram of a fuel distribution system according to an example embodiment of the present invention.

FIG. 9 illustrates a block diagram of a fuel distribution system 900 according to an example embodiment of the present invention. Fuel distribution system 900 may be implemented as a gas station, convenient store, marina, and/or any other fuel distribution environment. Although FIG. 9 illustrates an example implementation, numerous other implementations (such as the implementation shown in FIG. 2) may be used in conjunction with the embodiments of the present invention. As shown in FIG. 9, example fuel distribution system 900 may include one or more point of sale terminals 910, backend server 920, router 930, site controller 940, fuel tank gauges 950, and fuel distribution mechanisms 960.

Point of sale terminals 910 may include a cashier's terminal, personal computer, and/or any other data terminal configured to process payments for fuel dispensed by fuel distribution mechanisms 960. Point of sale terminals 910 typically include a user input device (e.g., a keyboard, touchscreen, etc.), a display device (e.g., LCD monitor), and one or more devices for receiving and/or processing payments (e.g., a credit/debit card reader, cash drawer, etc.). For example, each of terminals 910 may further include a variety of input devices such as scale unit 911, card reader/pin-pad 912, and card reader 913. Terminals 910 also enable the cashier to process payments according to the various embodiments of the invention.

In some embodiments, fuel distribution system 900 may be coupled to backend server 920. For example, backend server 920 may be a transaction server that includes a variety of components configured to process fuel transactions. For example, backend server 920 may receive and store payment information. In addition, backend server 920 may be configured to process fuel transactions in conjunction with a variety of remote financial institutions (e.g., Visa, Mastercard, etc.).

In addition, fuel distribution system 900 may be coupled to site controller 940. Site controller 940 may include a variety of components configured to control distribution of fuel at mechanisms 960. For example, site controller 940 may generate and/or receive control signals depending of receipt of payment and/or availability of a particular grade of fuel. For example, fuel tank gauges 950 may monitor the availability of a particular grade of fuel.

Fuel distribution mechanisms 960 may include fuel pumps, or any other appropriate fuel distributing apparatuses. For example, fuel distribution mechanisms 960 may be implemented using single or multiple hose configurations. In another example, fuel distribution mechanisms 960 may distribute one or more fuels, such as gasoline, diesel, ethanol, electrical charge, and the like. Similarly, fuel distribution mechanisms 960 also may distribute varying fuel grades. Fuel distribution mechanisms 960 are typically configured to operate in cooperation with terminals 910 such that fuel may be distributed and payments may be processed.

In view of the foregoing, the systems and methods described herein provide improved techniques for resolving errors that occur during the fuel transaction process. According to the various embodiments, the fuel payment modules provide improved functionality such that if a fuel sale is paid for in error by the wrong customer, the fuel sale can be paid for again by the correct customer. The payment for the original wrong fuel sale is then may be used against the outstanding sale amount. In other words, a fuel transaction that was erroneously completed may be identified and selected. Next, a second payment may be received for the same fuel transaction. One of the duplicate payments may be applied to any unpaid fuel transaction. In addition, any still remaining unpaid amounts may then be cleared.

It will be apparent to those skilled in the art that various modifications and variations can be made in the fuel pump with correction mechanism of the present invention without departing form the spirit or scope of the invention. Thus, it is intended that the present invention cover the modifications and variations of this invention provided they come within the scope of the appended claims and their equivalents.

I claim:

1. A method for distributing fuel at a plurality of fuel pumps, the method comprising:
   distributing fuel at a first fuel pump and at a second fuel pump;
   erroneously receiving multiple payments for the distribution of fuel at the first fuel pump;
   applying one of the multiple payments to an outstanding transaction of the second fuel pump;
   calculating a difference amount between the payment applied to the second fuel pump and an amount associated with the outstanding transaction of the second fuel pump; and
   resolving the difference amount.

2. The method according to claim 1, wherein the difference amount is resolved as a drive-off.

3. The method according to claim 1, wherein the difference amount is applied to a subsequent transaction.

4. The method according to claim 1, wherein one or more reports of erroneous fuel transactions may be generated on a periodic basis.

5. The method according to claim 1, further comprising:
generating a report to track and store an amount of fuel sold in connection with one or more erroneous fuel transactions.

6. The method according to claim 1, further comprising:
generating a report to track and store an amount of each grade of fuel sold in connection with one or more erroneous fuel transactions.

7. A non-transitory computer readable storage medium storing one or more programs configured to be executed by a processor, the one or more programs comprising instructions for:
distributing fuel at a first fuel pump and at a second fuel pump;
erroneously receiving multiple payments for the distribution of fuel at the first fuel pump;
applying one of the multiple payments to an outstanding transaction of the second fuel pump;
calculating a difference amount between the payment applied to the second fuel pump and an amount associated with the outstanding transaction of the second fuel pump; and
resolving the difference amount.

8. The computer readable storage medium according to claim 7, wherein the difference amount is resolved as a drive-off.

9. The computer readable storage medium according to claim 7, wherein the difference amount is applied to a subsequent transaction.

10. The computer readable storage medium according to claim 7, wherein one or more reports of erroneous fuel transactions may be generated on a periodic basis.

11. The computer readable storage medium according to claim 7, further comprising instructions for:
generating a report to track and store an amount of fuel sold in connection with one or more erroneous fuel transactions.

12. The computer readable storage medium according to claim 7, further comprising instructions for:
generating a report to track and store an amount of each grade of fuel sold in connection with one or more erroneous fuel transactions.

13. A fuel distribution system comprising:
a plurality of fuel pumps;
one or more processors; and
memory storing one or more programs for execution by the one or more processors, the one or more programs including instructions for:
distributing fuel at a first fuel pump and at a second fuel pump;
erroneously receiving multiple payments for the distribution of fuel at the first fuel pump;
applying one of the multiple payments to an outstanding transaction of the second fuel pump;
calculating a difference amount between the payment applied to the second fuel pump and an amount associated with the outstanding transaction of the second fuel pump; and
resolving the difference amount.

14. The fuel distribution system according to claim 13, wherein the difference amount is resolved as a drive-off.

15. The fuel distribution system according to claim 13, wherein the difference amount is applied to a subsequent transaction.

16. The fuel distribution system according to claim 13, wherein one or more reports of erroneous fuel transactions may be generated on a periodic basis.

17. The fuel distribution system according to claim 13, further comprising instructions for:
generating a report to track and store an amount of fuel sold in connection with one or more erroneous fuel transactions.

18. The fuel distribution system according to claim 13, further comprising instructions for:
generating a report to track and store an amount of each grade of fuel sold in connection with one or more erroneous fuel transactions.

19. The fuel distribution system according to claim 13, wherein the plurality of fuel pumps are connected to a backend server through a site controller and network connection.

20. The fuel distribution system according to claim 13, wherein an amount of each grade of fuel sold is tracked by one or more tank.

* * * * *

UNITED STATES PATENT AND TRADEMARK OFFICE
CERTIFICATE OF CORRECTION

PATENT NO. : 9,858,627 B2  
APPLICATION NO. : 15/155373  
DATED : January 2, 2018  
INVENTOR(S) : Elliott Page 1 of 1

It is certified that error appears in the above-identified patent and that said Letters Patent is hereby corrected as shown below:

In the Specification

In Column 3, Line 8, delete "and or" and insert -- and/or --, therefor.

Signed and Sealed this
Tenth Day of July, 2018

Andrei Iancu
*Director of the United States Patent and Trademark Office*